United States Patent [19]
Barefoot

[11] Patent Number: 5,992,082
[45] Date of Patent: Nov. 30, 1999

[54] FISHING LURE POUCH

[76] Inventor: Harold E. Barefoot, 3565 W. Frederick-Gingham Rd., Tipp City, Ohio 45371

[21] Appl. No.: 08/980,867
[22] Filed: Dec. 1, 1997
[51] Int. Cl.⁶ .................................................... A01K 97/06
[52] U.S. Cl. .............................................................. 43/25.2
[58] Field of Search ....................................... 43/25.2, 57.1

[56] References Cited

U.S. PATENT DOCUMENTS

| | | | |
|---|---|---|---|
| 2,627,133 | 2/1953 | Pletcher | 43/25.2 |
| 4,936,040 | 6/1990 | Reiter et al. | 43/25.2 |
| 5,233,783 | 8/1993 | Roebuck et al. | 43/25.2 |
| 5,297,676 | 3/1994 | Coleman | 43/25.2 X |

Primary Examiner—Robert P. Swiatek
Attorney, Agent, or Firm—William Weigl

[57] ABSTRACT

An elongated hollow fishing lure pouch is made of a relatively flexible elastomeric material having high memory retention and is operable by squeezing the ends of the pouch to open a slit extending lengthwise of the pouch for placement of a lure into and removal from the pouch. Hook and loop fastener tabs are provided on the pouch for attaching it to a fishing rod, thereby enabling the lure to be kept on the rod when not fishing or while transporting the rod. The pouch is deformable with one hand while enabling the other hand to be used for steadying the rod.

6 Claims, 1 Drawing Sheet

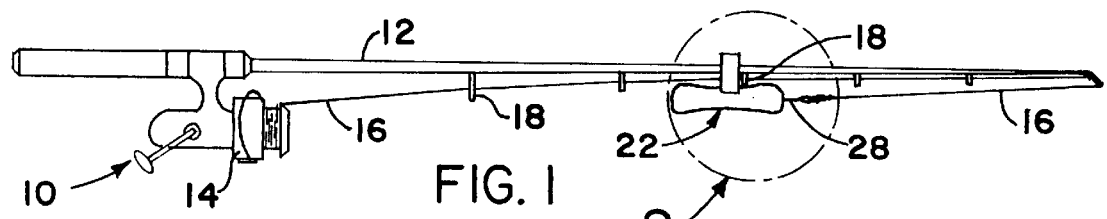
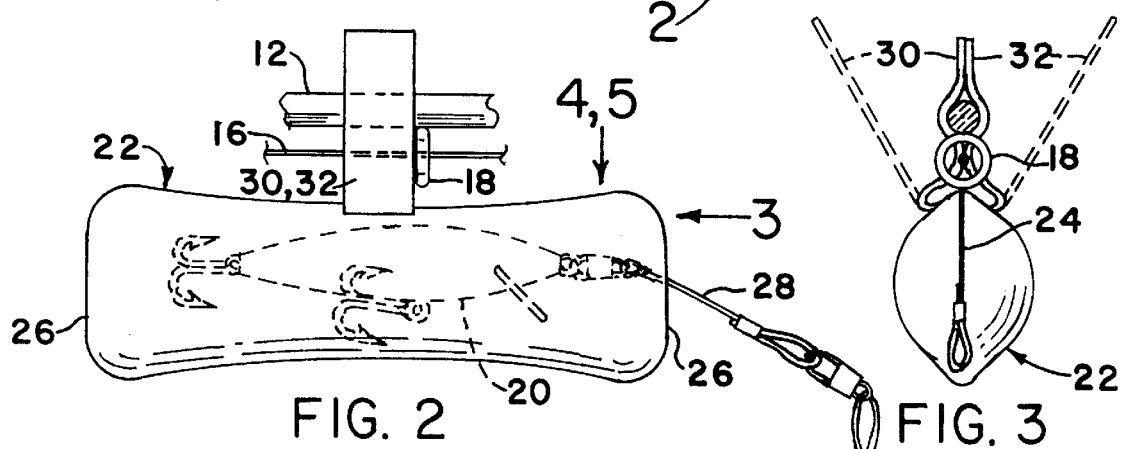
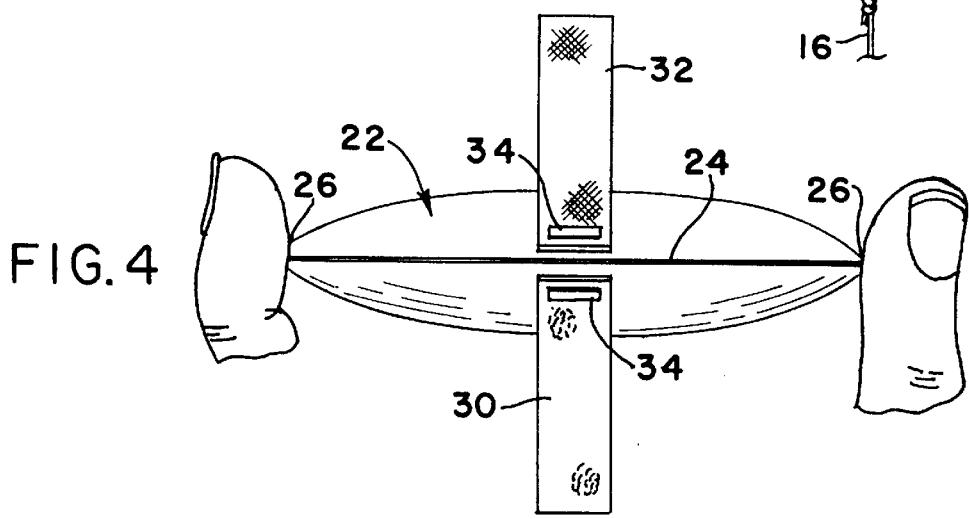
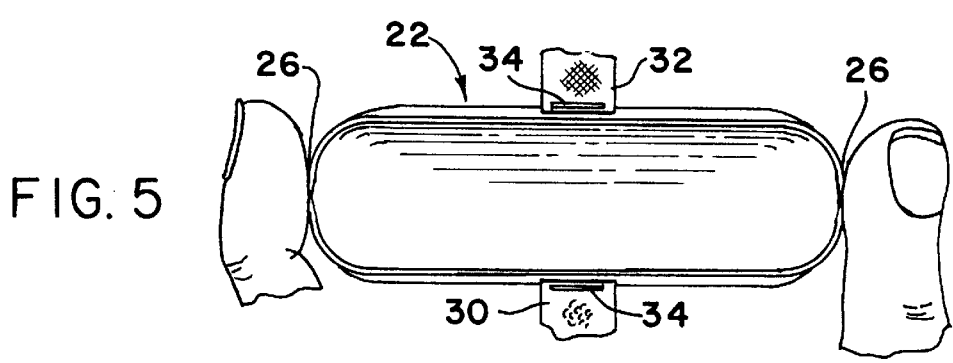

FISHING LURE POUCH

This invention relates to a flexible pouch for receiving and completely covering a fishing lure having one or more hooks thereon while it is not in use for fishing. Its function is to protect individuals, materials or objects from being snagged by the hooks, as well as to protect the lure from damage. In particular, it relates to a lure pouch which allows a lure to be retained on the line of a fishing rod and further includes means for securing the pouch to a portion of the rod.

BACKGROUND OF THE INVENTION

The sharp barbed tips of fishing hooks are well known for causing injuries to fishermen and snagging other things with which the hooks may come into contact. When the hooks are part of a lure having a body which is designed to attract fish, they oftentimes have multiple barbs, sometimes three or more to a lure. This makes handling a bit treacherous and increases the potential hazard of snagging, not only as a danger to a user, but also causing delays in whatever task was in progress at the time, since it frequently takes a considerable period of time to unsnag a hook from the object or person snagged.

It is known to provide covers for surrounding lures and enabling them to be retained on a fishing rod while not in use. One such cover consists of a molded hard plastic box which is large enough to contain the lure and also snap over a rod. It has a container section, a closable lid, usually a living hinge for the lid, and a snap means for retaining the lid in closed condition when containing a lure. The fishing line to which the lure is attached can extend laterally outwardly between the lid and container section, and presumably has the capability of preventing kinking of the line. While this version of lure protector is suitable, it would appear to require two hands to operate its being opened or closed to either remove or return the lure to the box and rod. This would complicate handling due to the necessity to lay down or prop up the rod and reel when ready to commence or discontinue fishing. This may be a necessity several times if the fisherman wishes to change from one location to another while stream fishing, and must walk through brush which poses a snag potential. The hard plastic also presents some risk of lure damage from jostling about in the box and the lure also has the possibility of its hook damaging the rod.

Another known cover is a flat rectangular flexible wrap with hook and loop fastener means such as the well-known Velcro around its outer edges. The wrap is made of a waterproof material normally not subject to being snaggable. By holding the wrap in the palm of his hand with the rod tying in its center and with the fastener means facing upwardly on each side of the rod, a fisherman can direct the rod to settle the lure onto one side of the wrap. Then, by bringing the other side of the wrap over and toward the tire, he can close his hand to cause the wrap to surround and fasten the lure to the rod. The sharp fish hook or hooks can directly contact and damage the rod and line unless the wrap is large enough to fully enclose the lure. At the time the wrap covers the rod, the fisherman must work his fingers around the outer edges of the wrap to assure that the lure, particularly its sharp barbs, is fully enclosed so as to remove any danger of snagging. Care must be taken to have a wrap which is large enough to surround the lure, and if the wrap is just large enough without much room to spare, the lure must be placed near perfectly within the wrap to avoid a hook sticking out of a side. It ordinarily requires two hands to remove the wrap when ready to begin fishing, necessitating either laying down or propping up the rod in order to do so.

Both of the above prior art devices are presently on the market, at least through catalog sales. They, as well as the design about to be described herein, typically come in a variety of sizes to accommodate the different sizes of lures used by an average lure fisherman.

In addition, a variety of lure protectors are known in the U.S. patent art. Some such devices which can be kept covered and on a fishing rod when not fishing are:

U.S. Pat. No. 5,199,208, cylindrical tube with slotted side for threading a line thereinto to capture a lure within the tube, and finger at the outer back end of the tube for entering a rod eyelet to enable slack removal from the line;

U.S. Pat. No. 5,505,014, flexible, resilient molded plastic material folds over a rod, line and lure, and has fasteners to connect the sides opposite the fold line;

U.S. Pat. No. 5,588,245, complicated hinged box which is fastened around the rod, lure and line;

U.S. Pat. No. 5,598,658, cover is wrapped about a lure and attaches to the rod by hook and loop fastener means;

U.S. Pat. No. 5.625,977, hinged box in the shape of a fish operates like a clothes pin to open and close the box; and U.S. Design Pat. No. 275,338, hinged cylindrical lure protector covers lure.

SUMMARY OF THE INVENTION

An elongated hollow fishing lure pouch of a relatively flexible elastomeric material having high memory retention is operable by squeezing opposing ends of the pouch toward each other to open a slit which extends lengthwise of the pouch. This opening enables lure placement into or removal from the pouch. Means is provided on the pouch for attaching it to a fishing rod without lure contact with the rod or line, thereby enabling the lure to be kept on the rod when not fishing or while transporting the rod. The attachment means is capable of allowing the lure and pouch to be drawn up against a line guide on the rod to remove slack from the line when not in use.

A principal object of the invention is to enable a fishing lure to be retained in a hollow pouch with a fishing rod and reel when not in use for fishing, without concern for potential snagging of objects or persons with the fish hooks on the lure.

For one form of the invention, it is an object to avoid ever having to physically touch a fishing lure after it has been originally placed in a pouch, providing the pouch is dedicated to that lure alone.

An ancillary object is to provide a lure with a leader which extends outwardly of its pouch when therein, enabling lure removal from and installation on a line without physically handling the lure and its hooks.

Another object is to provide such a pouch of a flexible elastomeric material having high memory retention, thereby enabling a slit along one side of the pouch to be easily opened and automatically closed as a lure is removed from or installed in the pouch, by simply squeezing the ends of the pouch toward the center using two fingers of one hand or one hand pushing one end of the pouch toward the fisherman's chest or other force-resisting surface to open the slit.

A further object is to provide a means for fastening the pouch to rod, the fastening means being of a type enabling simple removal of the pouch from the rod by merely slightly tugging on the pouch laterally away from the rod.

Still another object of the invention is to provide a lure cover which maintains the lure out of contact with its rod while carried thereon.

Other objects and advantages will become apparent from the following description in which reference is made to the accompanying drawings.

BRIEF DESCRIPTION OF THE DRAWINGS

FIG. 1 is a side view of one conventional type of fishing rod having a lure pouch of my invention carried thereby for use in transporting the rod from one location to another.

FIG. 2 is an enlarged view of the pouch and a portion of the rod within the dot-dash circle 2 of FIG. 1.

FIG. 3 is an end view of the pouch looking in the direction of the arrow 3 of FIG. 2.

FIGS. 4 and 5 are top views of the lure looking in the direction of the arrow 4,5 of FIG. 2, FIG. 4 showing the pouch closed and about to have its ends pressed together for opening, and FIG. 5 showing the pouch already opened.

DETAILED DESCRIPTION OF THE PREFERRED EMBODIMENT

A typical fishing device 10 includes a rod 12 and reel 14. A fishing line 16 is wound about the reel 14 and extends from the reel to the distal end of the rod through typical line guides in the shape of eyelets 18. The line has attached thereto the body of at fishing lure 20 (see FIG. 2) about which a pouch 22 is provided to surround the lure when not in use for fishing. The barbed points of hooks on the lure are therefore covered, preventing the hooks from snagging persons or things, protecting them against injury. Additionally, the pouch 22 protects the lure 20 from damage. The pouch can be made in various lengths from about 3½ inches to 8 inches and in various girths to accommodate different sizes and shapes of lures.

My invention pertains to the lure pouch 22 itself, in which the body of the material of which the pouch is made is a highly flexible elastomer which has high memory retention restoring it to its original condition immediately and automatically upon release of distorting forces. The pouch body may be either opaque or transparent, the latter providing an additional feature of enabling viewing or identifying a lure without opening the pouch. This has some value where each lure has its own pouch, and several different lures are kept in a tackle box. One elastomeric material is commonly referred to as Plastisol, which is frequently used to cover metal objects such as pins or other projections to prevent them from being damaged or prevent their damaging of things with which they may come into contact. The material is not easily penetrable by a hook and therefore will not ordinarily snag the pouch. The same general type of elastomer has also been used in the manufacture of coin purses in the shape of a flat oval with a slit on one flat side thereof. When the purse was to be opened to remove or place coins thereinto, the ends were squeezed toward each other, opening the slit. The slit immediately closed upon removal of the squeezing force due to the memory retention of the material.

As seen in FIG. 3, a slit 24 is provided from one end of the pouch to the other along one elongated edge, and the slit extends inwardly approximately one-half of the distance toward the center of both ends 26 of the pouch. By having the slit 24 extend around approximately one-half of the length of the pouch 22, and by providing the pouch in a shape as illustrated in FIGS. 2–5, the slit opens relatively evenly into the wide, nearly parallel-sided slot shown in FIG. 5 when squeezed together at the ends between a thumb and middle finger. The lure 20 can be easily removed from the wide slot or, if being placed in the pouch, can easily freely enter the pouch 22 without being touched by the person during the placement.

The greatest risk to the fingers is normally when having to grip the lure during attachment to or removal from the line 16. Even this risk can be minimized through use of my invention, by including a short leader 28 placed near the end of the lure but having it extend outside the pouch as shown at the right of FIG. 2, if desired. If used thusly, each lure 20 can have its own pouch 22, depending on its size, and the lure can be kept in the pouch in the tackle box when not being used. For example, if a fisherman has five lures, each with its own pouch, all five can be kept in their own pouches at all times except when connected to the rod and when in use for fishing. When one lure is in use, its pouch can be kept in the person's pocket, ready for placement about the lure whenever fishing or fishing at that particular spot is discontinued.

The manner in which a pouch is fastened to and removed from the rod is as follows: Suppose the fisherman wants to move from one fishing spot to another and has to move through underbrush to get there. He would reel in his line, remove the pouch 22 from his pocket with the opposing sides of hook and loop fastener tabs 30 and 32 such as the well-known Velcro in their opened dotted-line positions of FIG. 3, squeeze the ends of the pouch toward each other and let the lure settle into the pouch and automatically close about the lure. He would then bring the pouch to the rod, and, with opposing fingers, he would press the tabs toward each other around the rod and line. At this time, the tabs 30 and 32 will assume their full-line positions of FIG. 3 and there will normally be some slack in the line 16. To prevent a slack line from catching on a branch when moving through the brush, the reel may be operated to tension the line and slide the pouch and lure along the rod toward the next eyelet 18 closest to the distal end of the rod 12, and be locked there. This sliding is possible since the hook and loop material are separated where they meet with the rod. When arriving at the new fishing spot, the fisherman could grasp the pouch in one hand and move it laterally away from the rod, simply stripping the tabs apart with a slight tug in so doing. As viewed from FIG. 1, this movement would be downwardly. After the pouch and lure are no longer in contact with the rod 16, and with the pouch still in his hand, the person would simply squeeze inwardly on the ends of the pouch until it assumes the shape shown in FIG. 5, and let the lure swing freely out of and away from the fisherman. The pouch would, due to the material of which it is made, want to immediately return to the shape of FIG. 4. Before permitting this to happen, however, I prefer to use my thumb to flip one of the tabs 30 or 32 into the slot in the pouch and let the pouch close about that tab. This prevents the tabs from reconnecting while the pouch is empty, making it easier to handle returning the lure to the pouch when later required.

Each of the tabs 30 and 32 may be easily secured to the pouch 22 with a single staple 34. The staples are preferably made of or are coated with a rust-inhibiting material. All parts of the pouch are compatible with the typical wet environment with which they come in contact. The particular pouch material, along with the only opening to the hollow inside of the pouch being the slit, allows the pouch to float for a considerable period if dropped into the water.

The body of the pouch 22 is primarily cylindrical for a major portion of its length, and its ends 26 gently taper into relatively blunt opposing edges. This particular shape allows the slit 24, when the edges are forced toward each other, to open essentially parallel throughout its length. When produced, the pouch is formed about an internal heated mold by being dipped into a liquid Plastisol until the coating reaches a thickness of about 3/32nds of an inch. It is then removed from the liquid and permitted to drip for a short period. The thickness is controlled by the temperatures of the mold and liquid, along with the amount of time the mold is immersed. It is then cured in an oven until it reaches its final desired solid state. The slit 24 is formed while the cured material is still about the mold, this slit then becoming the means for removing the pouch from around the mold as well as providing the slit 24 for use with a lure.

Various changes may be made in the design without departing from the spirit and scope of the claims.

Having described my invention, I claim:

1. A pouch for encompassing a fishing lure having a body and at least one fish hook while said lure is connected to a fishing line carried by a rod and reel, said pouch protecting said lure from damage and preventing said hook from snagging objects with which the hook might come into contact were it not so protected, said pouch comprising:

a). an elongated hollow body having an essentially cylindrical central portion, opposing ends including a pair of longitudinally aligned, essentially blunt edges and tapered portions merging each edge longitudinally into the adjacent end of said central cylindrical portion, said blunt edges extending perpendicularly of said hollow body and merging at the ends of said edges in a short radius at each opposing end;

b). a slit providing a closed condition of said hollow body, said slit extending partially along one blunt edge outwardly from adjacent its middle to its outer end, then lengthwise of and parallel to said hollow body to the opposing blunt edge and then inwardly to adjacent the middle of said opposing edge;

c). said body consisting of a highly flexible solid distortable elastomeric material having high memory retention and having a wall thickness sufficient to return said body to its original shape whenever distorting forces are removed therefrom; and d). said body, when opposing thumb and finger inwardly-directed lengthwise forces are applied to said blunt edges adjacent and below the ends of the slit, causing the slit to widen into an essentially parallel opening which is of sufficient width to enable removal or installation of a lure relative to said hollow body, and upon release of said forces, automatically returning said slit to its original, closed condition.

2. A pouch according to claim 1 including a pair of tabs extending essentially outwardly, one on each side of said slit between the ends of the body, said tabs having facing hook and loop fastening means which, when pressed together with the rod between them, mounts the pouch to and suspends it from the rod with the slit adjacent the rod.

3. A pouch according to claim 2 wherein said hook and loop fastening tabs are of a width enabling said reel to tension said fishing line to slide said pouch and lure firmly in contact with an eyelet on said rod.

4. A pouch according to claim 3 wherein said hook and loop fastening means enables said pouch to be stripped from said rod by grasping it in the palm of a hand and moving it laterally outwardly of said rod with the slit and any lure contained in said pouch extending away from the hand.

5. A pouch for encompassing a fishing lure having a body and at least one fish hook while said lure is connected to a fishing line carried by a rod and reel, said pouch protecting said lure from damage and preventing said hook from snagging objects with which the hook might come into contact were it not so protected, said pouch comprising:

a). an elongated hollow body having a central open portion for receiving a fishing lure, said body including opposing ends enclosing said open portion and merging with said central portion;

b). a slit providing a closed condition of said hollow body, said slit extending lengthwise of and parallel to said hollow body to adjacent the middle of each said opposing end;

c). said body consisting of a highly flexible solid distortable elastomeric material having high memory retention and having a wall thickness sufficient to return said body to its original shape whenever distorting forces are removed therefrom;

d). said body, when opposing thumb and finger inwardly-directed lengthwise forces are applied to the ends of the body, causing the slit to widen into an essentially parallel opening which is of sufficient width to enable removal or installation of a lure relative to said hollow body, and upon release of said forces, automatically returning said slit to its original, closed condition; and e). a pair of tabs extending essentially outwardly, one on each side of said slit between the ends of the body, said tabs having facing hook and loop fastening means which, when pressed together with the rod between them, mounts the pouch to and suspends it from the rod with the slit adjacent the rod.

6. A pouch according to claim 5 wherein said hook and loop fastening means enables said pouch to be stripped from said rod by grasping it in the palm of a hand and moving it laterally outwardly of said rod with the slit and any lure contained in said pouch extending away from the hand.

* * * * *